(12) United States Patent
Szyszko (10) Patent No.: US 9,550,352 B2
(45) Date of Patent: *Jan. 24, 2017

(54) MULTI-STATION ROTARY SCREEN PRINTER HAVING SUPPORT FOR HOLDING A CAP DURING PRINTING

(71) Applicant: Alexander Szyszko, Temecula, CA (US)

(72) Inventor: Alexander Szyszko, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,194

(22) Filed: Jul. 8, 2015

(65) Prior Publication Data

US 2016/0207301 A1    Jul. 21, 2016

Related U.S. Application Data

(63) Continuation-in-part of application No. 14/022,406, filed on Sep. 10, 2013, now abandoned.

(60) Provisional application No. 62/106,141, filed on Jan. 21, 2015.

(51) Int. Cl.
| | |
|---|---|
| *B41F 15/18* | (2006.01) |
| *B41F 15/08* | (2006.01) |
| *B41F 17/00* | (2006.01) |
| *B23Q 16/02* | (2006.01) |

(52) U.S. Cl.
CPC ......... *B41F 15/0863* (2013.01); *B23Q 16/025* (2013.01); *B41F 15/18* (2013.01); *B41F 17/005* (2013.01)

(58) Field of Classification Search
CPC ....... B41F 17/003; B41F 17/005; B41F 17/38; B41F 15/0863; B41F 15/18; B41F 15/0895; B41F 15/16; B41F 15/12; B41F 15/10; B41P 2200/40; B23Q 16/02; B23Q 16/025; B23Q 16/10; B23Q 16/102
USPC ....... 101/115, 123, 126, 129; 74/813 R, 816, 74/813 C, 821, 817
See application file for complete search history.

(56) References Cited

U.S. PATENT DOCUMENTS

| | | |
|---|---|---|
| 2,553,085 A | 4/1951 | Groce |
| 3,416,440 A | 12/1968 | Miller et al. |
| 3,427,964 A | 2/1969 | Vasilantone |
| 3,543,679 A | 12/1970 | Wahl |
| D231,574 S | 4/1974 | Landesman |
| D238,515 S | 1/1976 | Landesman |
| 4,084,504 A | 4/1978 | Fuchs |

(Continued)

*Primary Examiner* — Leslie J Evanisko
(74) *Attorney, Agent, or Firm* — Kirk A. Buhler; Buhler & Associates (57) ABSTRACT

Improvements in a rotary screen printer that operates with a stepper motor for indexing the screen printer. The stepper motor provides a positive rotation and locating of the printing arms. The stepper motor can also have a controlled acceleration and deceleration speed while it indexes. The stepper motor further drives a spur gear to improve the drive ratio from the stepper motor to the indexing arms. The rotary screen printer uses pneumatic cylinders to operate the screening arms. Pneumatic cylinders are controllable for the downward force by adjusting pressure regulator(s) and the stroke by adjusting either limit switches or mechanical stops. Each station is interchangeable to accommodate the printing requirements of each job. Each station can be operated as a screen printing station, a drying station, a pad printer, and the number of stations can be changed by reprogramming the number of steps between each station stop.

7 Claims, 7 Drawing Sheets

(56) References Cited

U.S. PATENT DOCUMENTS

| | | | |
|---|---|---|---|
| 4,478,144 A * | 10/1984 | Maloof | B41F 15/0895 |
| | | | 101/126 |
| 4,753,161 A * | 6/1988 | Kimball | B41F 15/18 |
| | | | 101/115 |
| 4,981,074 A | 1/1991 | Machita et al. | |
| 5,014,614 A * | 5/1991 | Thieme | B41F 15/0895 |
| | | | 101/126 |
| 5,419,244 A | 5/1995 | Kutman | |
| 5,490,456 A * | 2/1996 | Richardson | B41F 15/0872 |
| | | | 101/114 |
| 5,520,106 A | 5/1996 | Karlyn | |
| 5,678,482 A | 10/1997 | Daniel et al. | |
| 5,720,090 A | 2/1998 | Dawson, Jr. | |
| 5,784,956 A | 7/1998 | Walz | |
| 6,053,101 A | 4/2000 | Hix | |
| 6,152,030 A | 11/2000 | Fuqua | |
| 7,231,873 B2 | 6/2007 | Macchi | |
| 7,424,851 B2 | 9/2008 | Landesman et al. | |
| 2006/0249039 A1 | 11/2006 | Feldman et al. | |

\* cited by examiner

MULTI-STATION ROTARY SCREEN PRINTER HAVING SUPPORT FOR HOLDING A CAP DURING PRINTING

CROSS REFERENCE TO RELATED APPLICATIONS

This application claims the benefit of U.S. provisional application Ser. No. 62/106,141 filed Jan. 21, 2015, and is a continuation-in-part of applicant's co-pending application Ser. No. 14/022,406 filed Sep. 10, 2013 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a rotary screen printer. More particularly, the rotary screen printer is a mechanized screen printing machine where an operator installs a product and the product is precisely rotated around to various printing stations for application of colors, textures, coatings or drying.

Description of Related Art Including Information Disclosed Under 37 CFR 1.97 and 1.98

Over the years screen printing has evolved from an operator manually positioning a single such as a shirt on a platen, lowering a patterned silk screen and screening a single color or color blend. The applied color(s) then typically air dried and application of additional color(s) were applied in the same manner. This traditional silk screen printing of textiles and other supports has well-known limitations of resolution and rendering. One of the problems is with the use of a reasonable maximum number of silk-screen printing stencils needed for the sequential application of as many silk-screen printing inks or pastes, each application needing a drying step.

With more modern printing methods need to be developed. Some solutions such as digital print by a common inkjet plotter color graphical compositions on dark or black supports. Another limitation of digital printing is the impossibility of forming features in relief or of introducing special effects such as for example: glitters, glues, expanded materials, in order to obtain peculiar esthetical effects in the drawing or graphical image to be reproduced on the printable support.

Traditional silk-screen printing technique permits the use of special inks or pigmented pastes and therefore the printing may be done on any surface even black without any problem. Silk screen printing technique have trouble with the presence on the printing area of reliefs and/or depressions as may be produced by the presence of sewing lines, hems, pockets and the like in the printing area. With these challenges, registration of the textile is critical to ensure that each color is placed in the required location as the textile progresses through the printing process.

A number of patents and or publications have been made to address these issues. Exemplary examples of patents and or publication that try to address this/these problem(s) are identified and discussed below.

U.S. Pat. No. 3,427,964 that issued on Feb. 18, 1969 to M. Vasilantone discloses a stencil printing machine. This machine has a stretcher assembly which is pivotal vertically and a horizontally rotatable platen assembly having a plurality of baseboards where the stretcher assembly is indexed for multi-colored printing. This patent requires manual indexing of the stretcher assembly and either requires the operator to move between each of the colors or for four operators to print a single shirt.

U.S. Pat. No. 7,231,873 that issued on Jun. 19, 2007 to Luigi Macchi discloses a print carousel for double technology silk-screen and digital color printing. This machine has a plurality of print stations that are rotary indexed with a pneumatic or similar indexing system and then the silk-screen in brought down and the ink applied. While this system uses a rotary indexing printer the drive mechanism is not a stepper motor that can both ramp to indexing rate and provide a positive position lock.

U.S. Publication Number 2006/0249039 that issued on Nov. 9, 2006 to Alon Feldman et al., discloses a combined stencil and digital printing system. This system also uses a pneumatic actuator to index the table and a position lock to prevent undesirable movement of the table position while the object is being printed with either an ink jet or a silk screen printing stencil. While this publication discloses a rotary printing table, the table is indexed with a pneumatic actuator and requires a lock to hold the table in a ridged position.

What is needed is a rotary screen printing machine where the indexing of the table is performed with a stepper motor drive to provide reliable acceleration and deceleration of the rotating platen(s) and further provides a ridged lock without the arms being compliant.

BRIEF SUMMARY OF THE INVENTION

It is an object of the rotary screen printer to operate with a stepper motor for indexing the screen printer. The use of a stepper motor provides a positive rotation and locating of the printing arms. The stepper motor can also have a controlled acceleration and deceleration speed while it indexes. The stepper motor further eliminates the need for a locating pin to stop the printer in an exact location and prevent compliance movement while the printing operation is in process. The stepper motor further drives a spur gear to improve the drive ratio from the stepper motor to the indexing arms.

It is an object of the rotary screen printer to use pneumatic cylinders to operate the screening arms. The use of pneumatic cylinders provides a smooth stroke to the printing screens and squeegees that is comparable to the force and motion that would be applied by a person. The pneumatic cylinders are controllable for the downward force by adjusting pressure regulator(s) and the stroke by adjusting either limit switches or mechanical stops.

It is an object of the rotary screen printer for the printer to be self-contained and free standing to allow multiple rotary screen printers to be placed or re-positioned within a facility. This allows greater flexibility for a printing operation as the company expands.

It is another object rotary screen printer for each of the stations to be interchangeable to accommodate the printing requirements of each job. Each station can be operated as a screen printing station, a drying station, a pad printer. The use of a stepper motor to index the printer further allows for changes to the number of printing stations by simply reprogramming the number of steps between each station stop.

It is another object of the rotary screen printer to utilize curing stations at some stations. The curing stations can be thermal air or UV light to set the ink, dies or other media that is being applied. Because the stations can be quickly interchanged, multiple curing stations can also be plated between printing stations to ensure a more complete curing before another color is applied.

It is another object of the rotary screen printer to print drink koozie on one or multiple sides. When printing is required on multiple sides the platen is automatically flipped to print on the opposing sides. The flipping operation is performed with a pneumatic piston that turns the platen over. Locking arms at each station keep the platen from rotating when the koozie is being printed.

It is another object of the rotary screen printer to print on the surface of baseball type caps. The printing platen has alignment arms that position and retain the baseball cap in proper orientation to ensure that multiple passes on the cap are properly registered. The locating arms move with the printing platen as the printing platens index between printing and drying positions.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
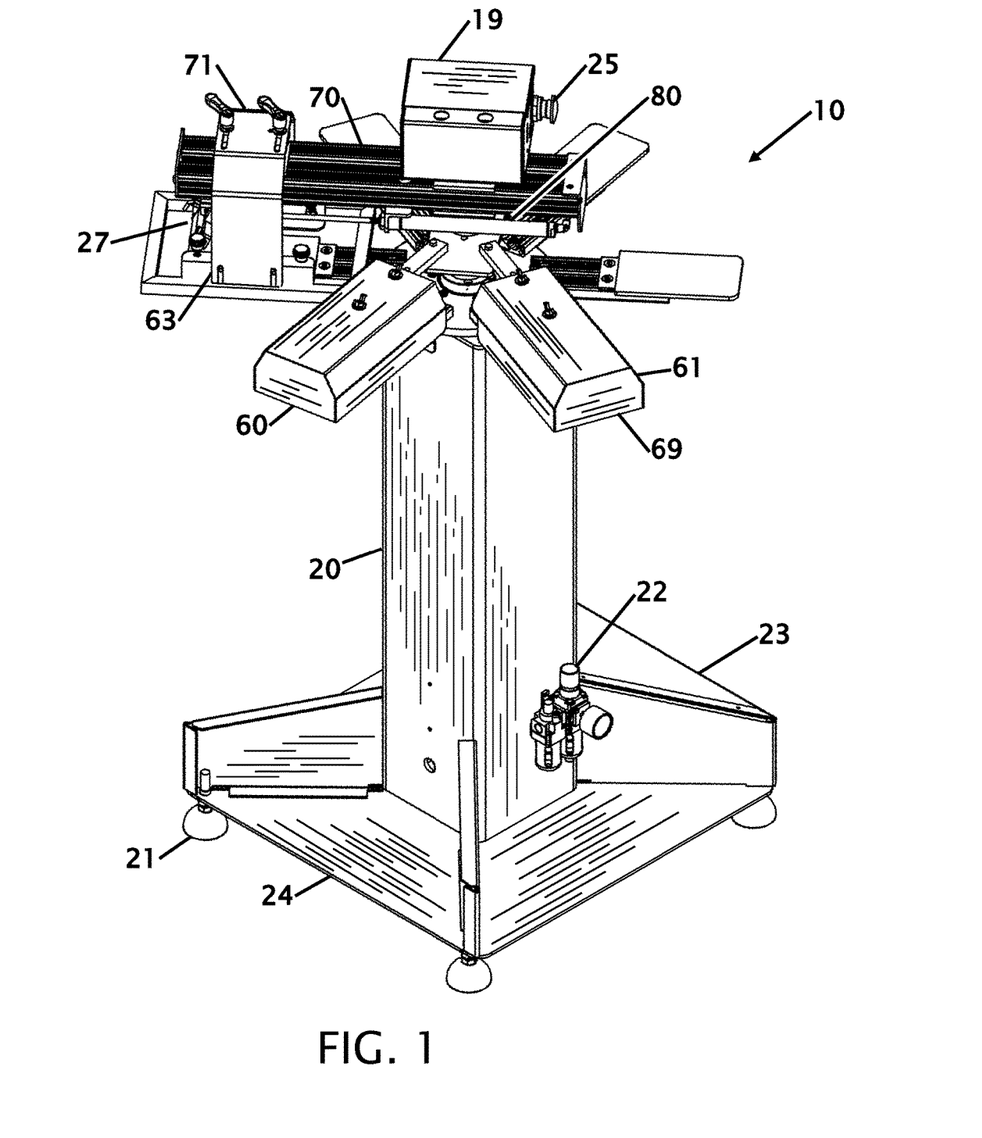
FIG. 1 shows a perspective view of the rotary screen printer.

FIG. 1 shows a perspective view of the rotary screen printer 10. The rotary screen printer 10 is constructed in and upright orientation with a base 24 configured with a plurality of support feet 21. The feet 21 are adjustable to accommodate uneven flooring. An upright frame support 20. An air pressure regulator 22 is shown mounted near the base 24 of the rotary screen printer 10. The air pressure regulator controls the incoming air pressure to the unit. The regulator may also include a water trap and an air oiling mechanism. The regulator 22 is connected within the support frame to a variety of control units (not shown) to control movement of pneumatic devices such as the pneumatic piston cylinder and rod 80. A raised frame area 23 covers the pneumatic control switches that can be accessed by a cover plate.

The top portion of the rotary screen printer 10 shows a plurality of stations. In this preferred embodiment six stations are shown. Because the rotary screen printer 10 utilizes a stepper motor drive to rotate and lock the printing arms in position the printer can be configured with a variety of print stations. The preferred embodiment of six arms allows for four colors of printing with one loading and one unloading station. It is also contemplated that a drying or flash cure unit is installed at the last station or between stations to dry the ink or die prior to removal of the item being printed or to dry one material or color before applying another.

At the top of the rotary screen printer a control box 19 with a stop or step button 25 is located. The control box is located upon a raised track 70 where a printing squeegee 27 is located that is moved with the pneumatic cylinder 80. The Printing squeegee 27 is raised and lowered onto the print surface to apply ink or die. A frame 71 bridges over the top of the printing station 63. The top of the frame 71 has locking and or adjustment handles to position the location of the printing/screening area.

In this embodiment two drying stations 60 and 61 are shown. The drying station can be from heat, or in this preferred embodiment from UV light. The drying stations are shown and described in more detail in FIG. 5. A back plate 69 along with the side plates reduces exposure of the UV light.

Figures 2, 3:
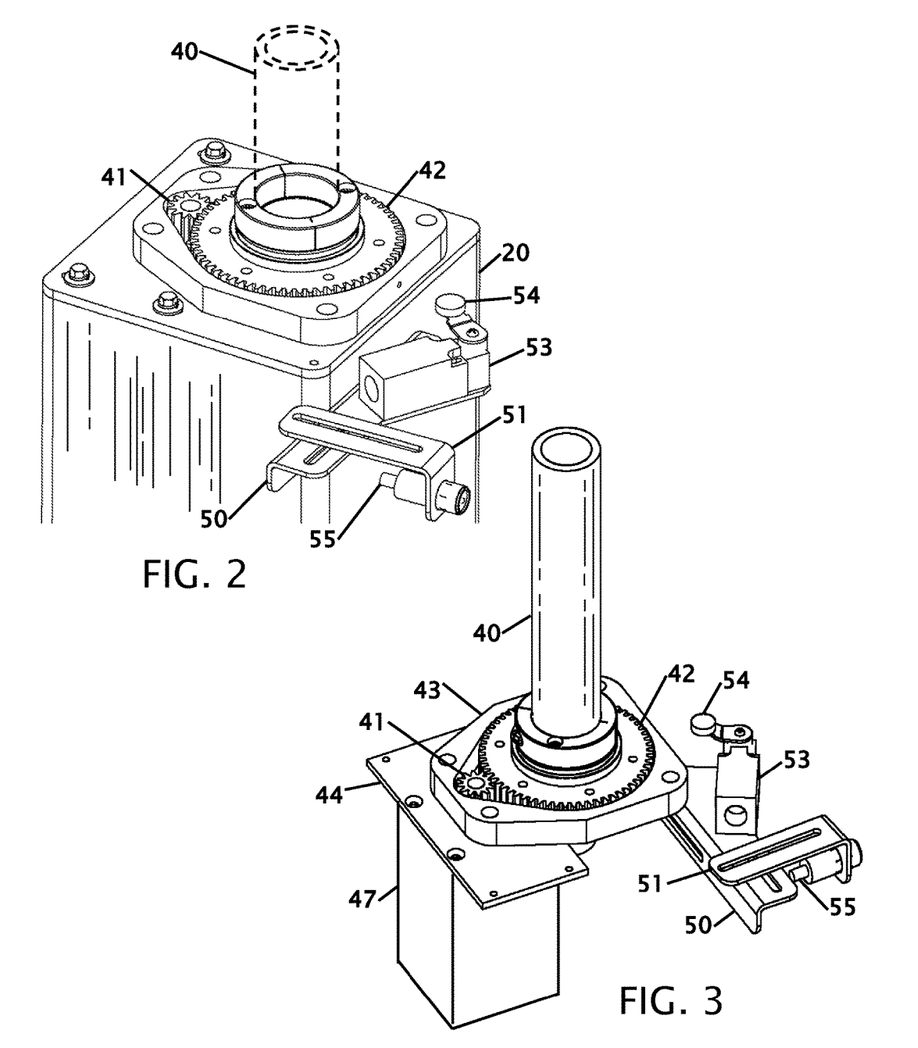
FIG. 2 shows a top perspective view of the switch stop mechanism.
FIG. 3 shows a top perspective view of the index and drive mechanism.

FIG. 2 shows a top perspective view of the switch stop mechanism, FIG. 3 shows a top perspective view of the index and drive mechanism. From FIG. 3 the stepper motor 47 is shown below the motor mount plate 44. A spur gear 41 is connected to the stepper motor 47 and drives gear 42 that is connected to the arms or platens. A frame 43 surrounds the gear drive mechanism for protection of the drive from contamination and from harm to operators. The use of a stepper motor is superior to other motors that are used to turn objects. Other rotary printers use pneumatic cylinders that require a locking mechanism to hold the rotary table in a fixed location. Servo motors require encoders and are fairly compliant thereby allowing movement of the position.

The stepper motor 47 uses magnetic forces to rigidly hold the rotary table is the exact location without the need to use locking mechanisms. The use of a stepper motor 47 also allows for adjustment in the acceleration and deceleration of movement of the rotary table. The number of steps between stations can also be reprogrammed to increase or decrease the number of stations. In this preferred embodiment the spur gear 41 with the larger driven gear 42 increases the driving and holding force from the stepper motor 47.

The drive system is supported by a top plate on the upright frame 20. On the side of the upright frame the switch stop mechanism is located. The switch stop mechanism is one or more an optical, mechanical 53 or inductive sensor 55 mounted on adjustable hardware 50 and 51 that allows for position adjustment. The mechanical switch sensor 53 has an armed switch with a roller 54 that is tripped as the platen(s) index.

Figure 4:
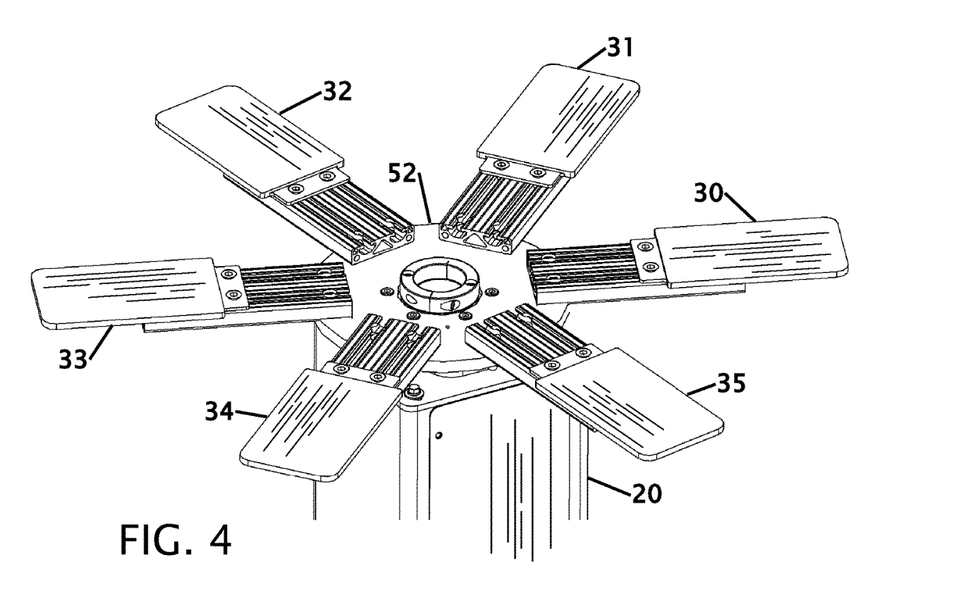
FIG. 4 shows a top perspective view of the base unit.

The central post 40 can be fixed to gear 42 or can be held in a fixed position as shown here thereby allowing the arms or platen(s) 30-35 as shown in FIG. 4 to move under any printing or curing mechanism.

FIG. 4 shows a top perspective view of the base unit with six arms of platens extending from a support plate 52 that is mounted to the drive gear 42 from FIGS. 2 and 3. The six platen arms 30-35 are drive around the upright frame 20 by the previously described stepper motor drive system where they are individually indexed into position for loading, printing, drying and unloading.

Figure 5:
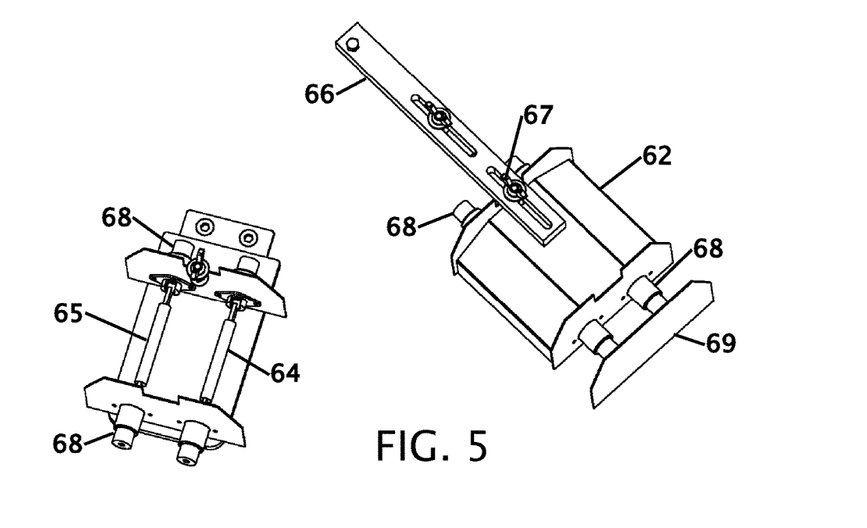
FIG. 5 shows perspective detail views of the dryer units.

FIG. 5 shows perspective detail views of the dryer units. From FIG. 1, the dryer units are located with the covers 60 and 61. The back cover 69 from the unit covered by item 61 is shown in both FIGS. 1 and 5 to provide and orientation reference. The dryers include UV or similar light or heating tubes or elements 64 and 65. In the left sub assembly the elements 64 and 65 are visible, while in the right sub assembly the elements are covered with a reflecting shroud 62 that is secured with hardware 67 to support arm 66. While two elements are shown, more or less quantity of elements is contemplated as few as one to more than two can be utilized. Insulating conductors 68 both suspend the UV elements and provide electrical connection to the UV elements 64 and 65. The dryers are supported on arm(s) 66 that are directly or indirectly secured to the central post as shown in FIG. 6.

Figure 6:
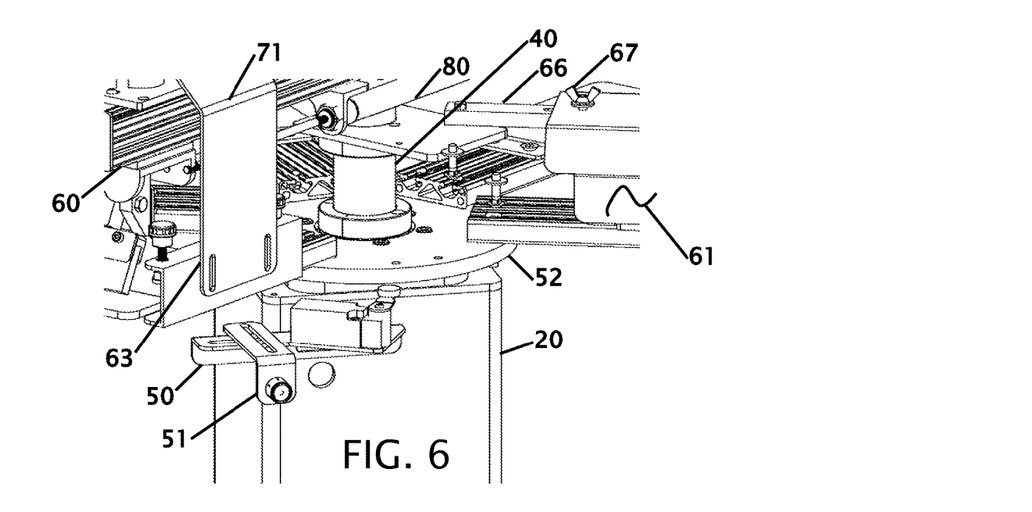
FIG. 6 shows the indexing hub with an arm removed.
Figure 7:
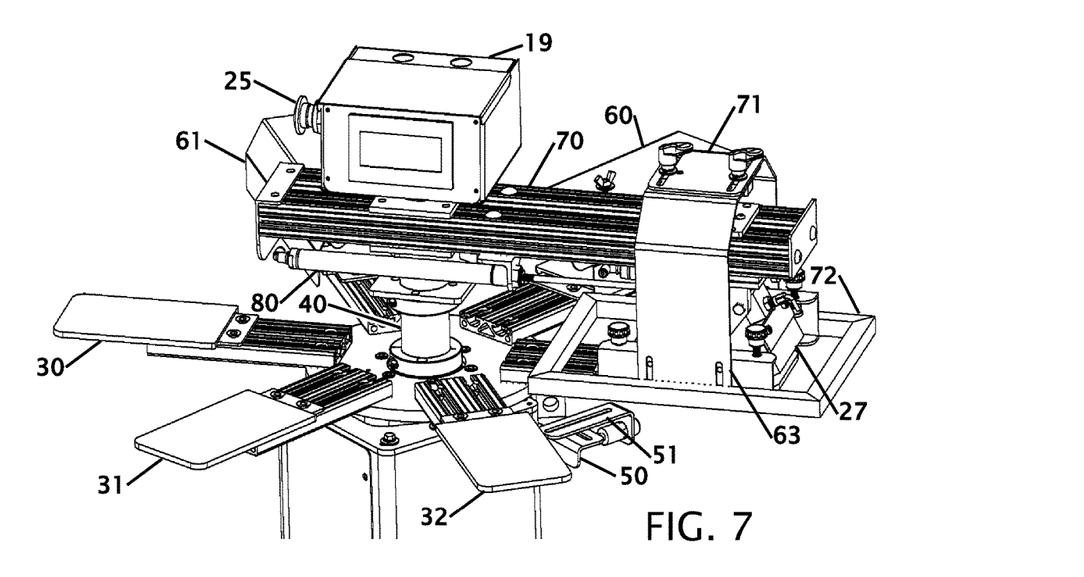
FIG. 7 shows a front perspective view of the printing units.

FIG. 6 shows the indexing hub with an arm removed and FIG. 7 shows a front perspective view of the printing units. From both of these views the arms or platens 30-32 etc. . . . are shown extending around on the support plate 52 and above the upright frame based 20. FIG. 6 shows support arm 66 connecting with hardware 67 to UV cover 61. Below the platens the stop switch mechanism along with the mounting hardware 50, 51 is shown. FIG. 7 shows a profile view of a printing station where the control box 19 is mounted on top of the central post 40 with stop/start/step button 25. Portions of the UV arm covers 60 and 61 can be seen in FIG. 7. The track or guide 70 connects the center post 40 to the screen printing mechanism or station 63 where a frame bridge 71 connects to a frame 72 that supports the screening pieces and the squeegee 27. Movement of the squeegee is from pneumatic cylinder/piston 80.

Figure 8:
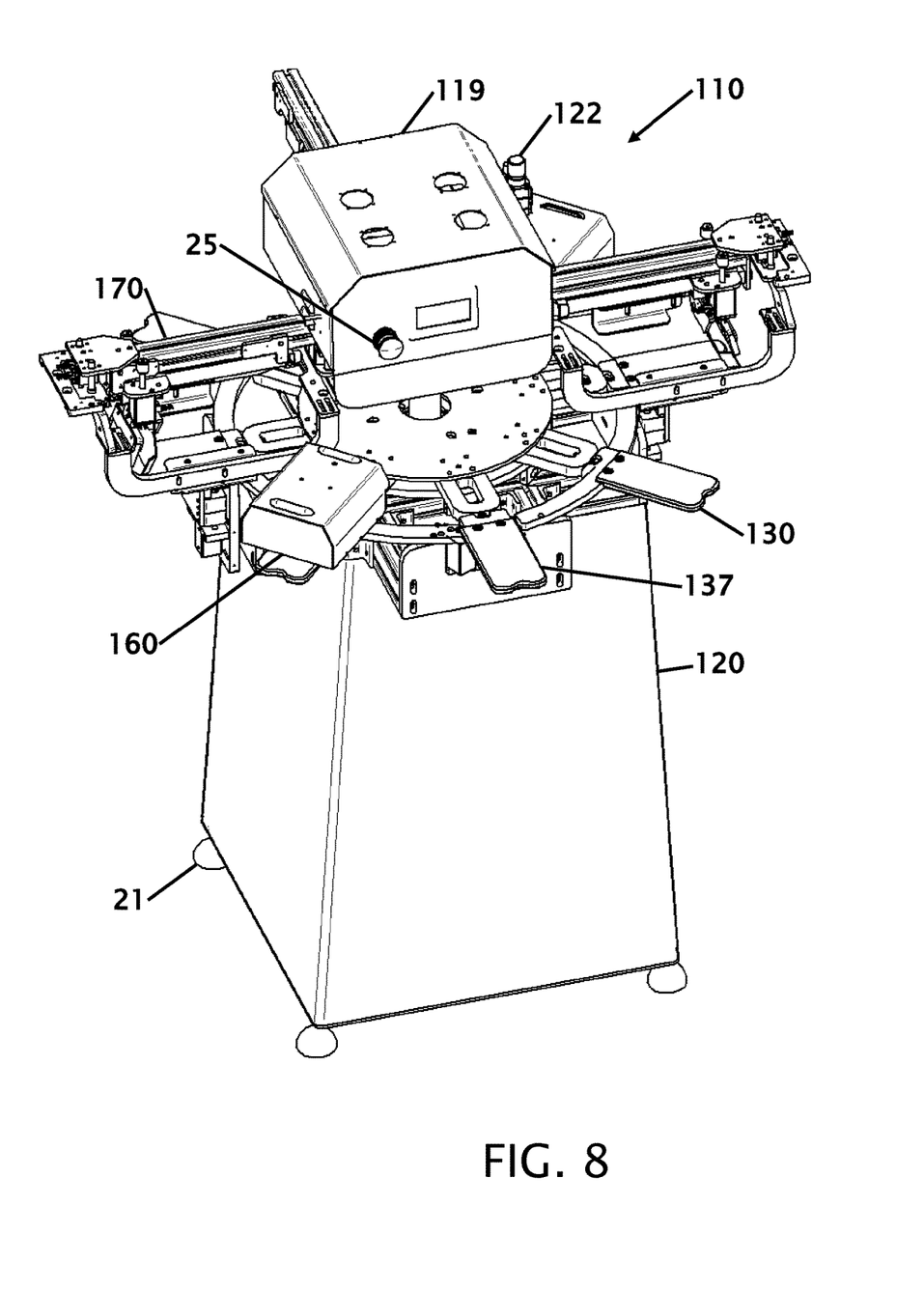
FIG. 8 shows a top perspective view of a KOOZIE rotary printer.

FIG. 8 shows a top perspective view of a KOOZIE rotary printer. This rotary screen printer 110 is constructed in and upright orientation with a base configured with a plurality of support feet 21. The feet 21 are adjustable to accommodate uneven flooring. An upright frame support 120. An air pressure regulator 122 is shown mounted on the control head 119. The air pressure regulator 122 controls the incoming air pressure to the unit. The regulator may also include a water trap and an air oiling mechanism. The regulator 122 is connected to a variety of control units (not shown) to control movement of pneumatic devices such as the pneumatic piston cylinders and rods.

The top portion of the rotary screen KOOZIE printer 110 shows a plurality of stations. In this preferred embodiment eight stations are shown. Because the rotary screen printer 110 utilizes a stepper motor drive to rotate and lock the printing arms in position the printer can be configured with a variety of print stations. The preferred embodiment eight arms or platens 130 allow for printing on each side of a KOOZIE, with a loading station, a flipping station, printing and drying stations 160. It is also contemplated that a drying or flash cure unit 160 is installed at the last station or between stations to dry the ink or die prior to removal of the item being printed or to dry one material or color before applying another.

At the top of the rotary screen printer a control box 119 with a stop or step button 25 is located. The control box 119 is located upon a raised track 170 where a printing squeegee is located that is moved with the pneumatic cylinder. The printing squeegee is raised and lowered onto the print surface to apply ink or die. A frame bridges over the top of the printing station. The top of the frame has locking and or adjustment handles to position the location of the printing/screening area. To show the operation of the KOOZIE flipping platens, the printing, the drying and the control is shown removed in later figures in this disclosure.

Figure 9:
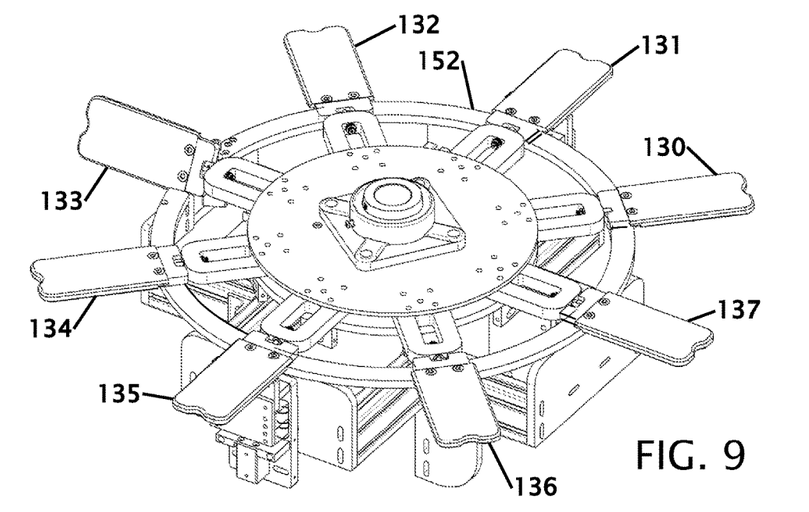
FIG. 9 shows a top perspective view of the rotary table with the KOOZIE platens.

FIG. 9 shows a top perspective view of the rotary table with the KOOZIE platens 130-137. All eight platens 130-137 are shown in this figure. Platen 133 is shown in the process of being flipped. The platens are at least partially supported on ring segment(s) 152.

Figures 10, 11:
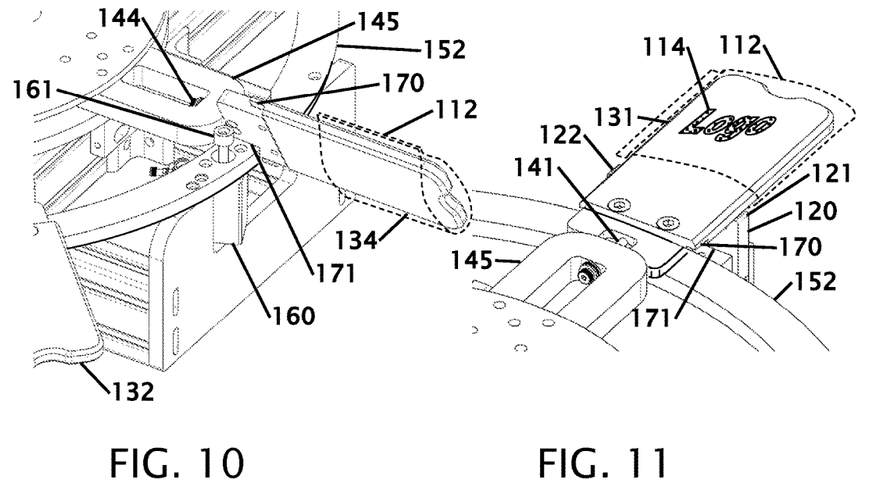
FIG. 10 shows a perspective view of a KOOZIE platen being rotated.
FIG. 11 shows a perspective view of the KOOZIE platen with the holding plate.

FIG. 10 shows a perspective view of a KOOZIE platen 134 being rotated. In this figure, the platen 134 is shown pivotably connected through pivot rod 144 through supporting brace 145 that allows the KOOZIE platen 134 to flip 180 degrees. While only one platen 134 is shown in this figure, it should be understood that each platen will rotate (or flip) when the piston or actuator 160 pushes piston rod 161 up. The support ring 152 has corner stops 171 that maintain the edges 170 of the platens in a horizontal orientation. It is further contemplated that the platen can have detents or over-center devices that essentially hold the platen in one of two 180 degree opposed orientations. While two 180 degree opposed orientations are shown and described, the orientations can be 120 degree, 90 degree or other orientations. The platens are rotated with a mechanical piston, actuator or pneumatic cylinders. A KOOZIE 112 is shown over the platen 134. The platen only needs to make a single 180 degree rotation for each full rotation around the printing table.

FIG. 11 shows a perspective view of the KOOZIE platen with the holding plate 120. The holding plate 120 maintains the platen 131 in a flat orientation and further provides support under the platen to counteract downward printing forces. The sides of the holding plate 120 has side positioning tabs 121 and 122 that maintain the rotational position of the platen 131 in the printer. A KOOZIE 112 is shown with a logo 114 imprinted on one side of the KOOZIE 112. The platen 131 is further supported through rotating rod 141 that is supported by supporting brace 145. The support ring 152 supports the bottom of the platens as they rotate between stations and at each printing station.

Figure 12:
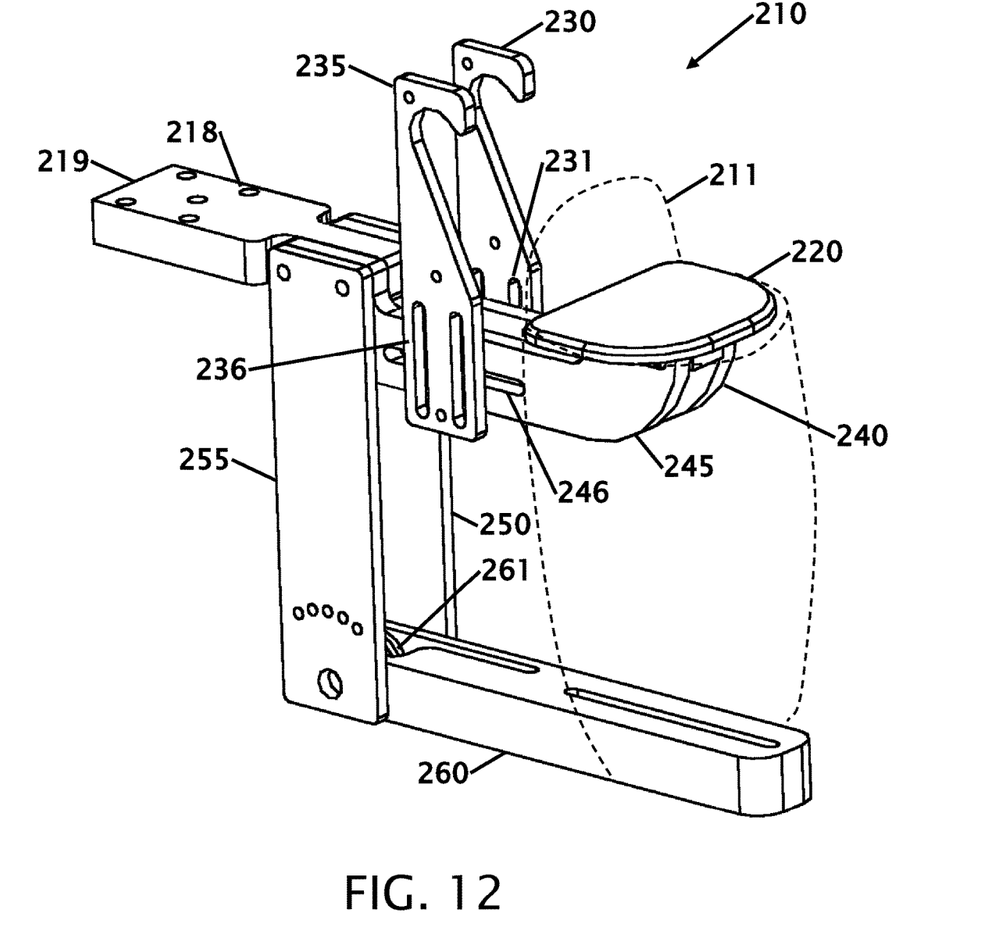
FIG. 12 shows a perspective view of a cap pallet for printing baseball caps.

FIG. 12 shows a perspective view of a cap pallet 210 for printing baseball caps. The cap pallet 210 secures with a pallet attachment arm 219 with a plurality of holes 218 for securing the arm to a printing machine or screen. The pallet attachment arm 219 connects to U-brackets 240 and 245 and also to stretcher brackets 250 and 255. The U-brackets 240 and 245 are connected to separate dash keepers 230 and 235 that are brought over the bill of the cap to maintain the position of the cap when printing the cap 211. The U-brackets 240 and 245 connect to a cap pallet or platen 220 where the printing in placed onto the front of the cap 211. Slots 231, 236 and 246 allow for positioning of the separate dash keepers 230, 235 on the U-brackets 240 and 245. When the cap 211 is installed onto the cap pallet 210 the back portion of the cap is secured under a stretcher bar 260 to keep the cap 211 under tension. A spring 261 pulls down on the stretcher 260 to prevent movement of the cap 211 while the cap moves between printing and or drying stations.

Thus, specific embodiments of a rotary screen printer have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A rotary screen printer for a cap having a bill, a front portion and a rear portion, the rotary screen printer comprising:
 a multi-station rotary printer;
 said multi-station rotary printer indexes a carousel with a stepper motor drive from a central hub through a plurality of stations;
 said multi-station rotary printer further includes a plurality of support arms that extend from the central hub;
 said multi-station rotary printer further includes at least one pneumatic station for application of ink or dye, and further including a cap pallet for supporting the cap during printing, said cap pallet comprising:
  a pallet attachment arm connected to a pair of U-brackets and to a pair of stretcher support brackets;
  said pair of U-brackets connected to a cap platen and to a pair of vertically positioned dash keepers;
  said pair of stretcher brackets having a stretcher bar that extends below said pair of vertically positioned dash keepers;
  said stretcher bar being connected to a pair of stretcher brackets through a pivoting axis,
 whereby when the cap is installed on the cap pallet, said vertically positioned dash keepers are brought over the bill of the cap, the cap platen supports the front portion of the cap, and the back portion of the cap is secured under said stretcher bar such that said stretcher bar placed inside the cap stretches the cap to keep the cap under tension during printing.

2. The rotary screen printer according to claim 1 wherein said stretcher bar pivots from said pair of stretcher brackets.

3. The rotary screen printer according to claim 2 further includes a spring between said pair of stretcher brackets and said stretcher bar.

4. The rotary screen printer according to claim 1 wherein said stretcher bar stretches the cap with gravity.

5. The rotary screen printer according to claim 1 wherein said pair of dash keepers centers said cap on said support bracket and each wrap at least partially around both sides of said cap.

6. The rotary screen printer according to claim 1 wherein a stepper motor is programmable for the number of steps between said plurality of stations.

7. The rotary screen printer according to claim 6 wherein said stepper motor is programmable for an acceleration from a first station and is programmable for a deceleration to a second station by changing or ramping a time between steps.

\* \* \* \* \*